(12) United States Patent
Iseli

(10) Patent No.: US 12,129,929 B1
(45) Date of Patent: Oct. 29, 2024

(54) UNIVERSAL MULTIPLE INSTRUMENTATION GLAND

(71) Applicant: Marco Daniel Iseli, Schoetz (CH)

(72) Inventor: Marco Daniel Iseli, Schoetz (CH)

( * ) Notice: Subject to any disclaimer, the term of this patent is extended or adjusted under 35 U.S.C. 154(b) by 0 days.

(21) Appl. No.: 18/731,453

(22) Filed: Jun. 3, 2024

(51) Int. Cl.
*F16J 15/52* (2006.01)

(52) U.S. Cl.
CPC ..................... *F16J 15/52* (2013.01)

(58) Field of Classification Search
CPC ........ F16J 15/52; H02G 15/013; H02G 3/088; H02G 3/0658
See application file for complete search history.

(56) References Cited

U.S. PATENT DOCUMENTS

| | | | | |
|---|---|---|---|---|
| 2,963,536 | A * | 12/1960 | Kokalas | H01R 13/5208 174/653 |
| 3,055,972 | A * | 9/1962 | Peterson | H02G 3/0658 277/621 |
| 3,697,089 | A * | 10/1972 | Jacisin | F16K 41/04 277/621 |
| 4,178,815 | A * | 12/1979 | Astill | F16H 1/32 475/180 |
| 4,267,401 | A * | 5/1981 | Wilkinson | H02G 9/10 277/621 |
| 4,567,544 | A * | 1/1986 | Ronemus | H01H 83/02 174/541 |
| 4,659,868 | A * | 4/1987 | Sala | H02G 1/10 174/23 R |
| 4,688,809 | A * | 8/1987 | Deppe | F16J 15/0818 277/594 |
| 5,450,765 | A * | 9/1995 | Stover | F16L 55/11 73/866.5 |
| 6,353,186 | B1 * | 3/2002 | Dams | G02B 6/4459 174/667 |
| 6,545,583 | B1 * | 4/2003 | Palmer | H01F 7/128 174/152 G |
| 7,939,769 | B2 * | 5/2011 | Hudlet | H01R 13/5208 439/456 |
| 9,006,589 | B2 * | 4/2015 | Graef | H02G 3/22 174/152 G |
| 9,059,538 | B2 * | 6/2015 | Showcatally | H01B 17/58 |
| 9,478,965 | B2 * | 10/2016 | Chalmers | H02G 15/34 |
| 10,179,556 | B2 * | 1/2019 | Tamura | B60R 16/0222 |
| 2020/0224767 | A1 * | 7/2020 | Chikamatsu | F16J 15/3232 |
| 2020/0378500 | A1 * | 12/2020 | Rhee | F16J 15/54 |

(Continued)

*Primary Examiner* — Eugene G Byrd
(74) *Attorney, Agent, or Firm* — Walter J. Tencza, Jr.

(57) ABSTRACT

An apparatus having a sealing gland to prevent leakage of fluid. The sealing gland includes a tensioner unit; a compression module; and a first structure, which may be part of an adaptor module. The first structure has a first opening into which the compression module is inserted. The first structure has a plurality of further openings into which part of the tensioner unit is inserted. The tensioner unit includes a union nut or a plurality of bolts; each inserted into a corresponding one of the further openings of the first structure, while each of the other bolts are inserted into a corresponding one of the further openings of the first structure. The first opening of the first structure may be surrounded by a peripheral wall, which includes a guiding chamfer, a sealing surface, a first support shoulder, a first positioning surface, a second support shoulder, and a second positioning surface.

14 Claims, 17 Drawing Sheets

(56) References Cited

U.S. PATENT DOCUMENTS

2023/0010390 A1* 1/2023 Wang .................... F16J 3/02
2023/0261539 A1* 8/2023 Chung .................. H02K 5/10
310/67 R

* cited by examiner

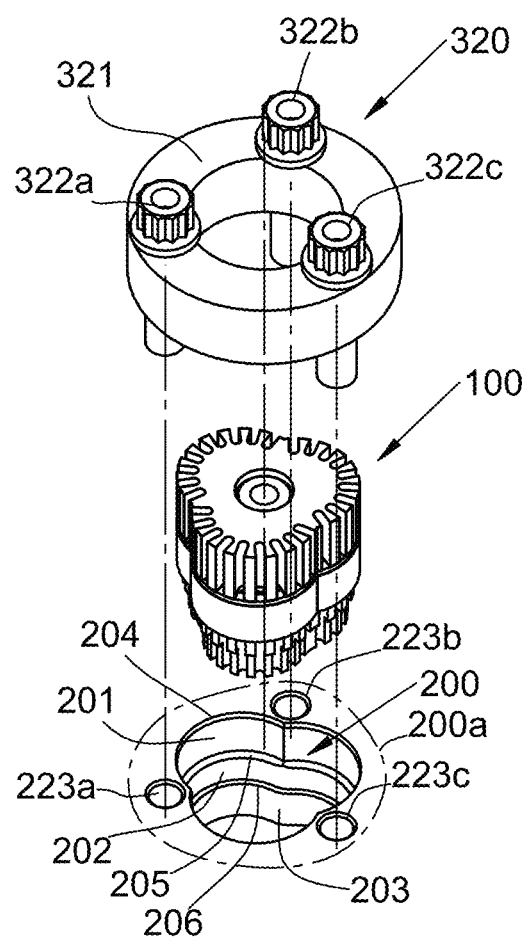

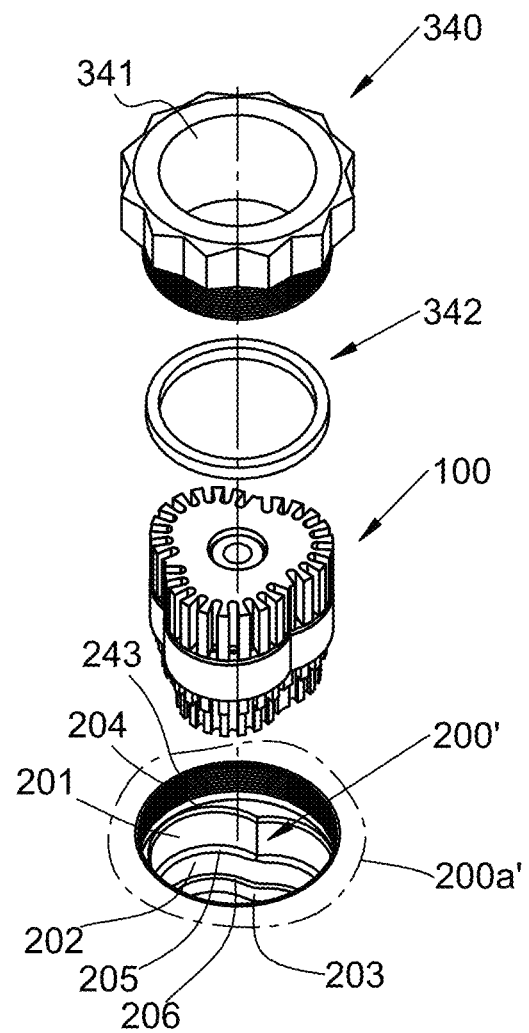

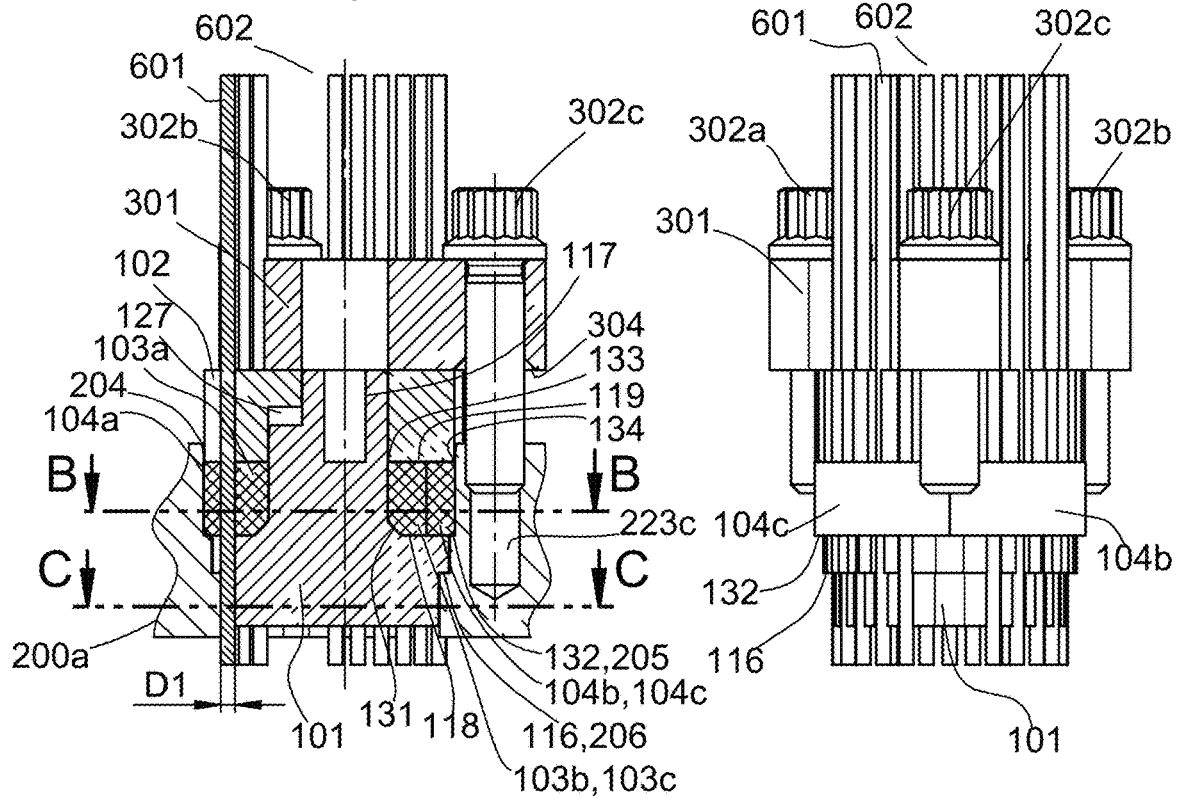

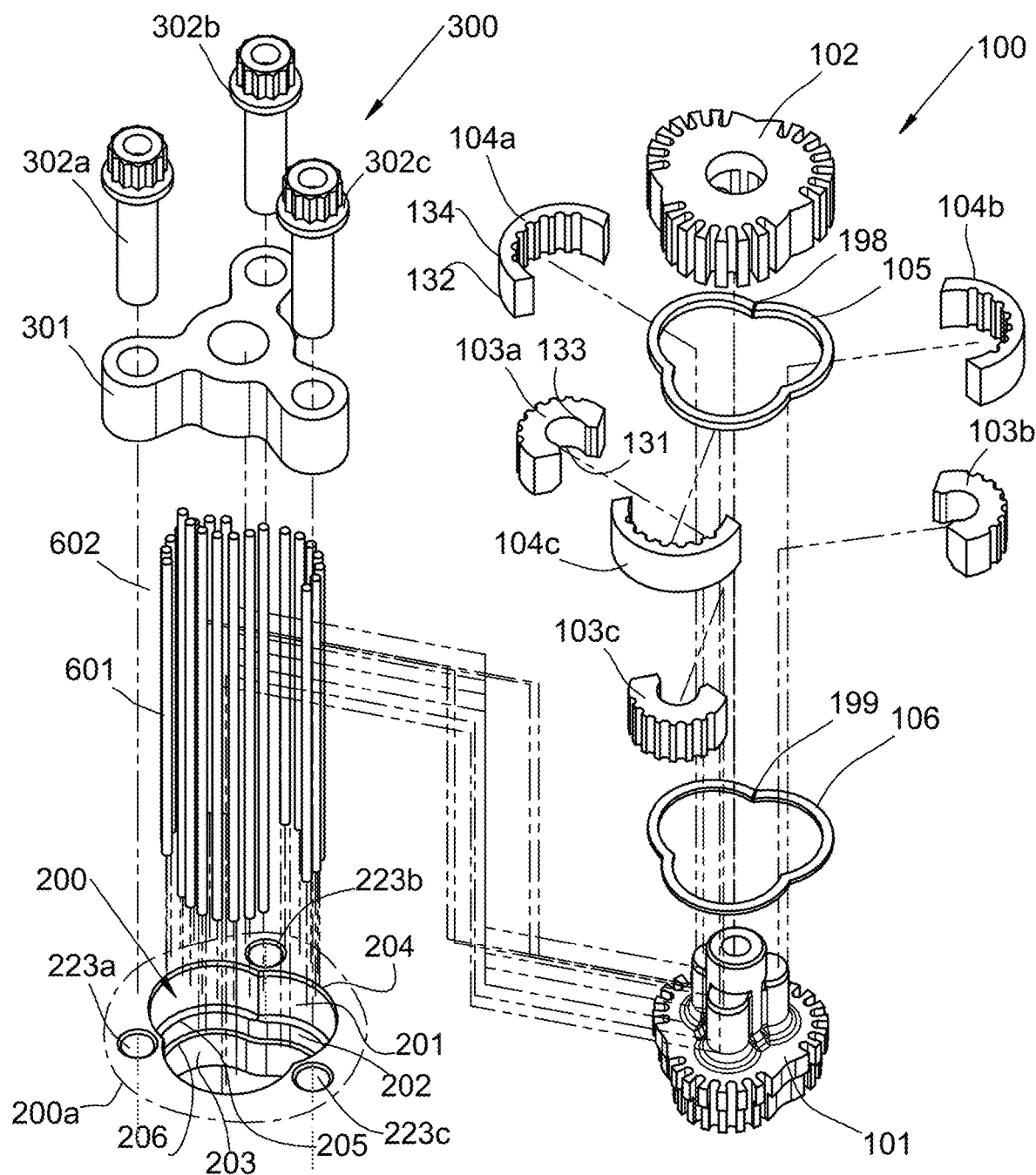

UNIVERSAL MULTIPLE INSTRUMENTATION GLAND

FIELD OF THE INVENTION

This invention relates to improved methods and apparatus concerning sealing glands, wherein a sealing gland in the present application is defined as "a device for preventing leakage of fluid past a joint in machinery" as defined at https://www.merriam-webster.com/dictionary/gland, second noun definition. More particularly, the present invention relates to sealing glands that are suitable for use in extreme environments, such as vacuum, high pressure, high temperature, hazardous fluid environments. Such sealing glands are configured to prevent fluid flow, pressure transmission, flame propagation, and chemical contamination between a penetrant portion and of at least one wire passing therethrough and dangling in dangerous conditions.

BACKGROUND OF THE INVENTION

For sealing glands, when multiple wires are involved, they are difficult to organize and to seal. Furthermore, when there are wires which have an extension on both ends (one end installed, other end with connector), it is difficult to pass these wires through a closed containment and keep a penetrant sealed. If a wire needs to be repaired or changed, the entire assembly needs to be replaced.

Typically, in the prior art seals and gaskets have long been used to seal wires, pipes, tubes, and other conduits to prevent leakage between compartments in a device. A gastight seal is especially important in situations where the conduit connects two environments of drastically different pressures or temperatures. A leak, even a small one, could compromise not only the integrity of the conduit, but also the integrity of the entire system. In addition, problems exist where wires can be easily damaged exiting extreme temperatures and pressurized environments. Sealing rings, cylinders with through holes, such as shown in U.S. Pat. No. 3,055,972, which is incorporated herein by reference, or flat gaskets, as shown in U.S. Pat. No. 7,939,769 B2, which is incorporated by reference, are typically used as a sealing device for passed-through sandwiched wires.

SUMMARY OF THE INVENTION

In at least one embodiment of the present invention, an apparatus is provided comprising: a sealing gland comprising a tensioner unit; a compression module; and a first structure.

In at least one embodiment, the first structure has a first opening into which the compression module is configured to be inserted; wherein the first structure has a plurality of further openings into which part of the tensioner unit is configured to be inserted.

The tensioner unit may include a plurality of bolts; wherein each bolt of the plurality of bolts is configured to be inserted into a corresponding one of the plurality of further openings of the first structure, while each of the other bolts of the plurality of bolts are inserted into a corresponding one of the plurality of further openings of the first structure.

The first opening of the first structure may be surrounded by a peripheral wall. The peripheral wall may include a plurality of steps. The plurality of steps may include a guiding chamfer, followed by a sealing surface, followed by a first support shoulder, followed by a first positioning surface, followed by a second support shoulder, and followed by a second positioning surface.

In at least one embodiment of the present invention, the first positioning surface is configured to support the compression module when it is inserted into the first opening; and the second positioning surface is configured to support a plurality of wires. The second support shoulder may be configured to support a carrier of the compression module.

The first structure may be part of an adaptor module.

In at least one embodiment of the present invention, a method is provided which may include using a sealing gland to prevent leakage of fluid past a joint in machinery. The sealing gland may be configured as previously described.

BRIEF DESCRIPTION OF THE DRAWINGS

FIG. 2B shows a perspective view of a second apparatus in a disassembled state, the apparatus including a second type of tensioner unit, the compression module with a stepped structural integration opening;

FIG. 2C shows a perspective view of a third apparatus in a disassembled state, the apparatus including a third type of tensioner unit, the compression module with a stepped structural integration opening;

FIG. 5A shows a cross sectional view of the first apparatus (previously shown disassembled in FIG. 2A) in an assembled state;

FIG. 5B shows a front view of the first apparatus without showing the stepped integration structure opening;

FIG. 5C shows a top view of the first apparatus;

FIG. 5D shows a cross-section B-B bottom view of the second apparatus at height of a sealing plane;

FIG. 5E shows a cross-section C-C view of the first apparatus at the height of the lower end of a carrier of the compression module;

FIG. 6 shows an exploded view of the first apparatus, and includes a plurality of wires;

DETAILED DESCRIPTION OF THE DRAWINGS

Figure 1:
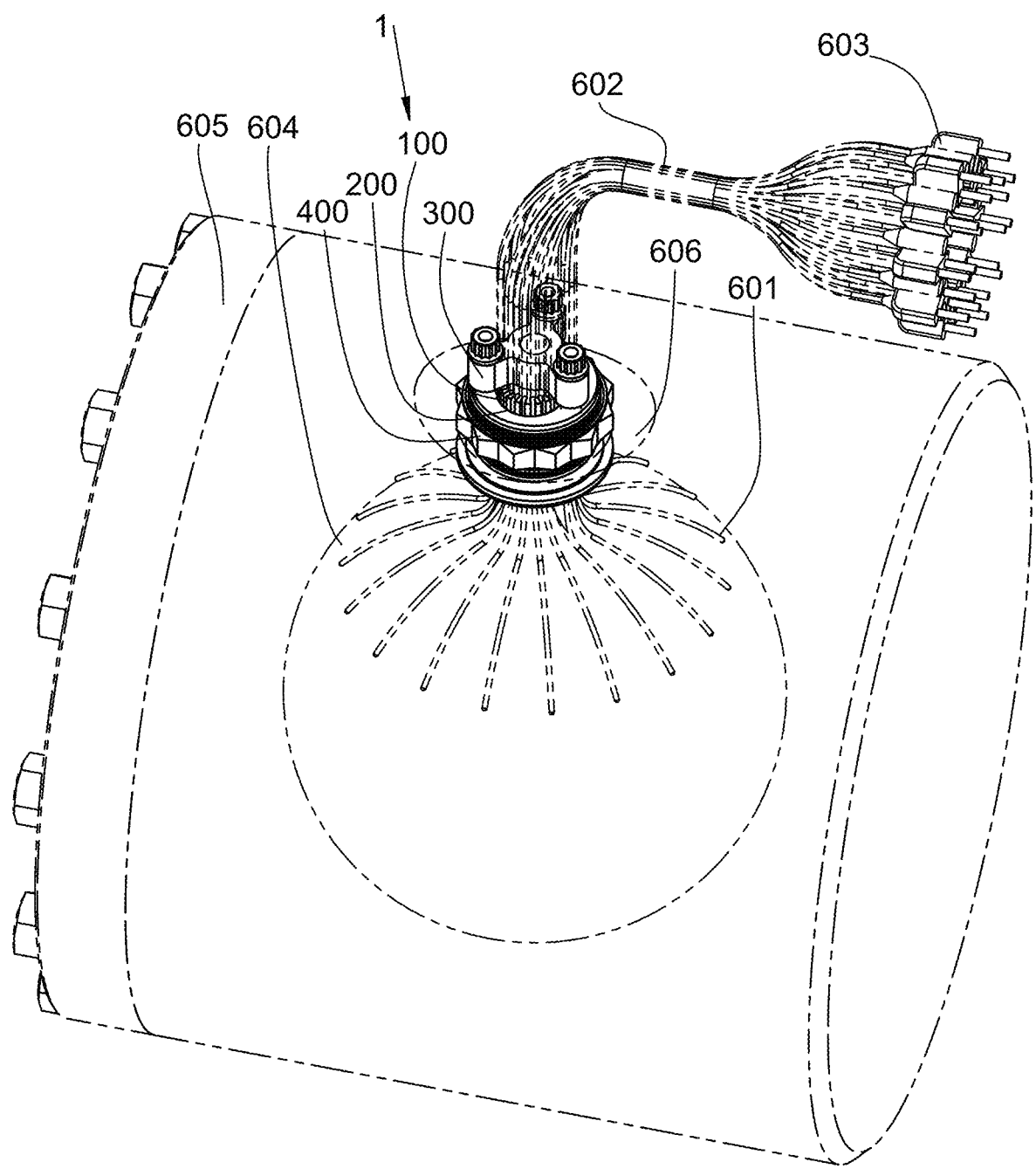
FIG. 1 shows a perspective view of an installed apparatus, the apparatus consist of a compression module which is installed in a stepped structural integration opening on an adaptor FIG. 3A by a tensioner unit FIG. 2A in accordance with an embodiment of the present invention.

FIG. 1 shows a perspective view of an apparatus representing a multiple instrumentation sealing gland 1, a containment, enclosure, or container 605 and components 601, 602, 603, 604, and 606, in accordance with an embodiment of the present invention.

The apparatus or multiple instrumentation gland 1 includes a compression module 100 which is installed in a stepped integration structure opening 200 in a first structure 200a (which is within the dashed lines shown in FIGS. 2A-2B) by a first type of tensioner unit 300 on a first type of adaptor module 400. The containment 605 which contains an object 604 with installed wires, the wire 601 having on the other end installed connecters 603 form a bundle of wires 602 The bundle of wires 602 is sealed and hold by the instrumentation gland 1. The components designation in the 600s are not part of the apparatus or gland 1 but shown to visualize the envelope of the application.

Figure 2A:
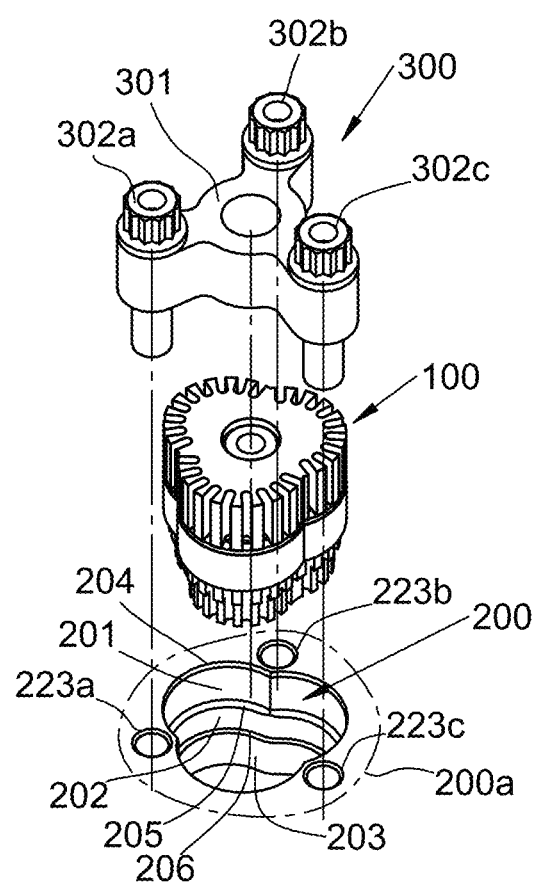
FIG. 2A shows a perspective view of a first apparatus in a disassembled state, the apparatus including a first type of tensioner unit, the compression module with a stepped structural integration opening.

FIG. 2A shows a perspective view of a first apparatus in a disassembled state, the apparatus including a first type of tensioner unit 300, the compression module 100 with the stepped structural integration opening 200.

The first type of tensioner unit 300 includes an inner bracket tensioner 301, and bolts 302a, 302b, and 302c. threaded holes 223a, 223b and 223c on a partially shown adaptor module of one of FIG. 3A-E, and stepped structural integration opening 200 having the counter contour for the compression module 100.

The stepped structural integration opening 200, in a first structure 200a has a sealing surface 201 a positioning surface 202 for the compression module 100 a positioning surface 203 for the wire 601 (shown in FIG. 5E) a guiding chamfer 204, a sealing support shoulder 205 and a support shoulder 206 for the carrier 101 (shown in FIG. 5B).

The stepped structural integration 200 opening with all its above-described functions are present on all tensioner types of FIG. 2A-2D.

FIG. 2B shows a perspective view of a second apparatus in a disassembled state, the apparatus including a second type of tensioner unit 320, the compression module 100 with the stepped structural integration opening 200.

The second type of tensioner unit 320 includes an outer bracket tensioner 321, and bolts 322a, 322b, and 322c.

FIG. 2C shows a perspective view of a third apparatus in a disassembled state, the apparatus including the third type of tensioner unit 340 including a tensioner nut with outside tread 341 and a slider ring 342. A counter thread 243 is shown as part of the structure 200a' Also shown in FIG. 2C is the compression module 100. FIG. 2C shows a stepped structural integration opening 200' in the structure 200a'. Moving from top to bottom of the opening 200', the opening or bore 200' is surrounded by guiding chamfer 204 at the top, then counter thread 243, then sealing surface 201, next the sealing support shoulder 205, next the positioning surface 202 for the compression module 100, next a support shoulder 206 for the carrier 101 (shown in FIG. 5B), and next a positioning surface 203 for the wire 601 (shown in FIG. 5E).

Figure 2D:
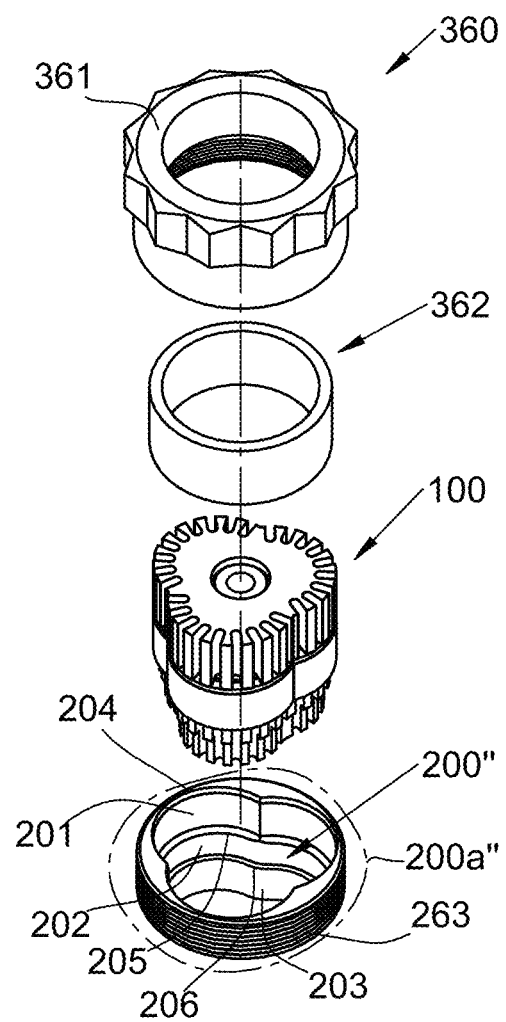
FIG. 2D shows a perspective view of a fourth apparatus in a disassembled state, the apparatus including a fourth type of tensioner unit, the compression module with a stepped structural integration opening.

FIG. 2D shows a perspective view of a fourth apparatus in a disassembled state, the apparatus including the fourth type of tensioner unit 360 including a tensioner nut with inside tread 361 and a extension ring 362 and an external counter thread 263. FIG. 2D also shows the compression module 100 with a stepped structural integration opening 200".

FIG. 2D shows a stepped structural integration opening 200" in the structure 200a". Moving from top to bottom of the opening 200", the opening or bore 200" is surrounded by guiding chamfer 204 at the top, then sealing surface 201, next the sealing support shoulder 205, next the positioning surface 202 for the compression module 100, next a support shoulder 206 for the carrier 101 (shown in FIG. 5B), and next a positioning surface 203 for the wire 601 (shown in FIG. 5E). The entire opening 200" is surrounded by external counter thread 263.

Figure 3A:
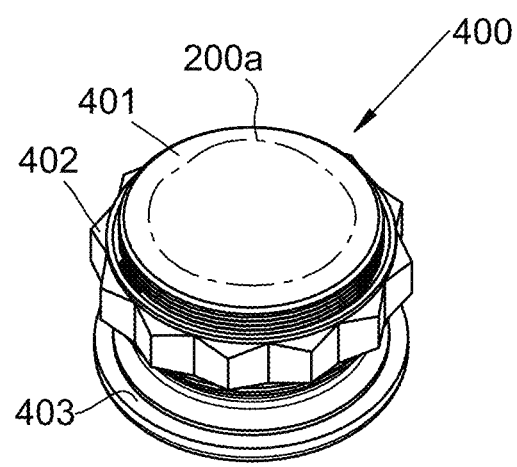
FIG. 3A shows a perspective view of a first type of adaptor module, the adaptor module is used for installation from inside (bulkhead fitting style) and needs to be combined with one of the tensioner units of FIG. 2A-D with compression module and stepped structural integration opening.

FIG. 3A shows a perspective view of a first type of adaptor or adapter module 400, the adaptor module is used for installation from inside (bulkhead fitting style), The adaptor module 400 has a bulkhead fitting 401 (which may be a Swagelok (trademarked) straight bulkhead adaptor SS-1610-61 as shown at https://products.swagelok.com/en/all-products/fittings/tube-fittings-adapters/bulkheads/c/155?clp=true), a union nut 402 and an inner sealing surface 403 and needs to be combined with one of the tensioner units 300, 320, 340, or 360 of FIG. 2A-D, respectively, with compression module 100 and with the stepped structural integration opening 200. FIG. 3A shows the location of structure 200*a* with respect to the adaptor module 400. The tensioner unit (one of 300, 320, 340, and 360), the compression module 100, and components of the structure 200*a* (including hole 200, holes 223*a-c*, and 201-206, are not shown in FIG. 3A, but would be inserted into and/or integrated with the adaptor module 400.

Figure 3B:
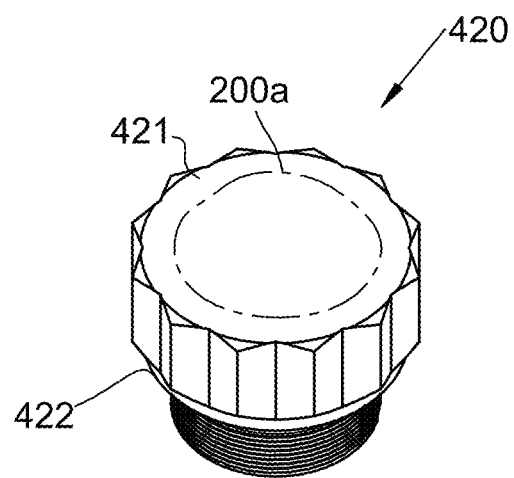
FIG. 3B shows a perspective view of a second type of adaptor module, the second adaptor module is used for threaded outside installation and needs to be combined with one of the tensioner units of FIG. 2A-D with compression module and stepped structural integration opening.

FIG. 3B shows a perspective view of a second type of adaptor module 420, the adaptor module is used for threaded outside installation, the adaptor module 420 includes a fitting 421 with an outer sealing surface 422 and needs to be combined with one of the tensioner units of FIG. 2A-D with the compression module 100 and with the stepped structural integration opening 200.

FIG. 3B shows the location of structure 200*a* with respect to the adaptor module 420. The tensioner unit (one of 300, 320, 340, and 360), the compression module 100, and components of the structure 200*a* (including hole 200, holes 223*a-c*, and 201-206, are not shown in FIG. 3B, but would be inserted into and/or integrated with the adaptor module 420.

Figure 3C:
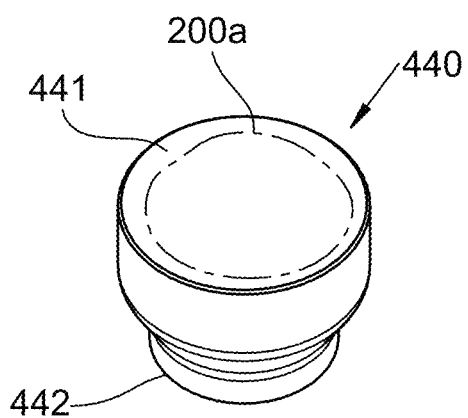
FIG. 3C shows a perspective view of a third type of adaptor module, the third adaptor module is used for weld outside installation and needs to be combined with one of the tensioner unit of FIG. 2A-D with compression module and stepped structural integration opening.

FIG. 3C shows a perspective view of a third type of adaptor module 440, the adaptor module is used for outside weld installation, the adaptor module 440 is comprised of a welding socket 441 with a weld neck 442 (which may be a Schwer (trademarked) welding socket GF-151G as shown at https://www.schwer.com/en_GB/welding-socket/pr/GF-151G) and needs to be combined with one of the tensioner units of FIG. 2A-D with compression module and stepped structural integration opening.

FIG. 3C shows the location of structure 200*a* with respect to the adaptor module 440. The tensioner unit (one of 300, 320, 340, and 360), the compression module 100, and components of the structure 200*a* (including hole 200, holes 223*a-c*, and 201-206, are not shown in FIG. 3C, but would be inserted into and/or integrated with the adaptor module 440.

Figure 3D:
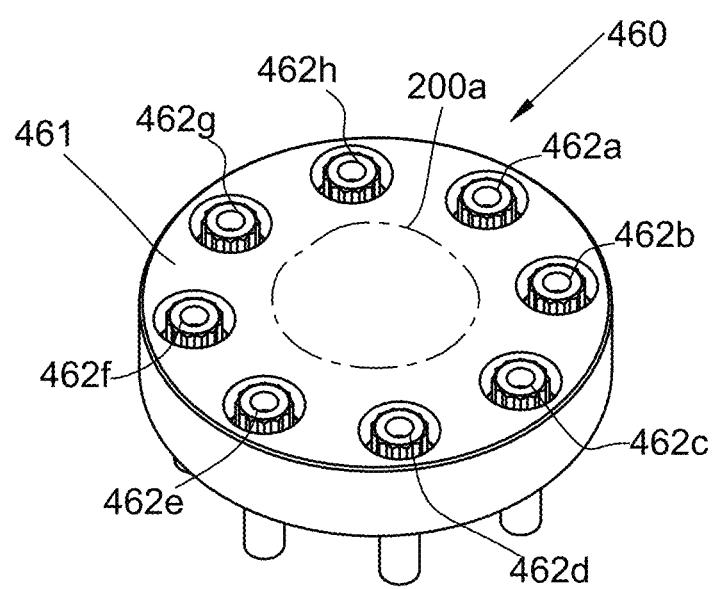
FIG. 3D shows a perspective view of a fourth type of adaptor module, the fourth adaptor module is used for flanged outside installation and needs to be combined with one of the tensioner units of FIG. 2A-D with compression module and stepped structural integration opening.

FIG. 3D shows a perspective view of a fourth type of adaptor module 460, the adaptor module is used for flanged outside installation the adaptor module 460 consist of a flange 461 with a plurality of bolts 462*a-h* and needs to be combined with one of the tensioner units of FIG. 2A-D with compression module and stepped structural integration.

FIG. 3D shows the location of structure 200*a* with respect to the adaptor module 460. The tensioner unit (one of 300, 320, 340, and 360), the compression module 100, and components of the structure 200*a* (including hole 200, holes 223*a-c*, and 201-206, are not shown in FIG. 3D, but would be inserted into and/or integrated with the adaptor module 460.

Figure 3E:
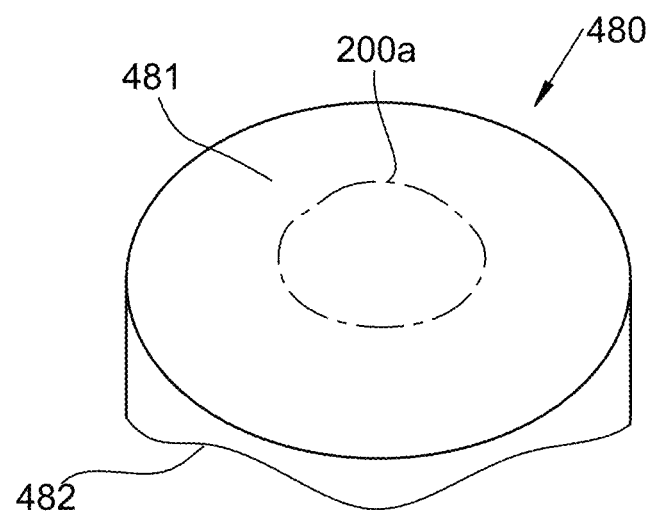
FIG. 3E shows a perspective view of a fifth type of adaptor module, the fifth adaptor module is used for integral installation and represents a generic portion of an independent embodiment and needs to be combined with one of the tensioner unit of FIG. 2A-D with compression module and stepped structural integration opening.

FIG. 3E shows a perspective view of a fifth type of adaptor module 480 for use for integral installation and represents a generic portion 481 of an independent embodiment 482 and needs to be combined with one of the tensioner unit of FIGS. 2A-D with compression module and stepped structural integration.

FIG. 3E shows the location of structure 200*a* with respect to the adaptor module 480. The tensioner unit (one of 300, 320, 340, and 360), the compression module 100, and components of the structure 200*a* (including hole 200, holes 223*a-c*, and 201-206, are not shown in FIG. 3E, but would be inserted into and/or integrated with the adaptor module 480.

The structure 200*a* shown in FIGS. 3A-3E, may be replaced by the structure 200*a'* shown in FIG. 2C or the structure 200*a"* shown in FIG. 2D.

FIGS. 4A-4E shows a disassembling procedure.

Figure 4A:
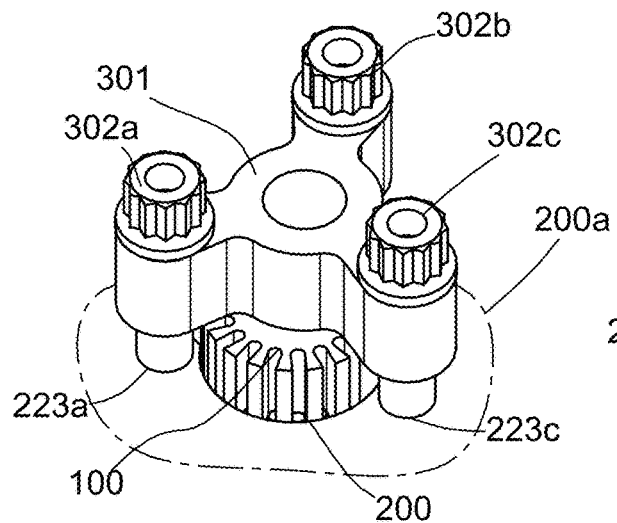
FIG. 4A shows a perspective view of the apparatus, in an assembled state, with part of the compression module hidden in a stepped integration structure opening and with the first type of tensioner unit, and with part of three bolts of the first type of tensioner unit of FIG. 2A with the inner bracket tensioner 301 and part of three bolts with the upper section of the threaded counter blind holes.

FIG. 4A shows a perspective view of the apparatus, in an assembled state, with part of the compression module 100 hidden by a partly shown surface of the structure 200*a* having a stepped integration structure opening 200, with the first type of tensioner unit 300 of FIG. 2A, with the inner bracket tensioner 301, and part of three bolts 302*a*, 302*b*, and 302*c*, and with the upper section of the threaded counter blind holes 223*a*, 223*b*, and 223*c*.

Figure 4B:
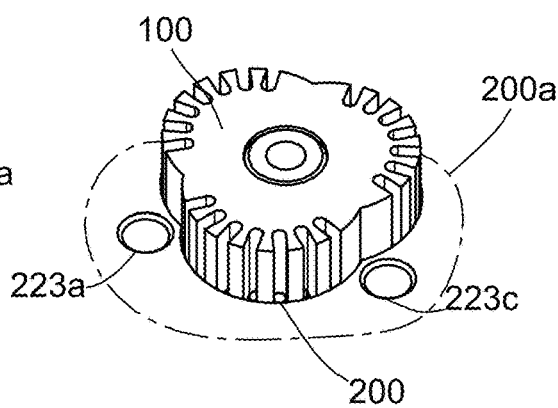
FIG. 4B shows a perspective view of the compression module hidden in a stepped integration structure opening.

FIG. 4B shows a perspective view of the compression module 100 installed on the partly shown surface of the structure 200*a*. FIG. 4B also shows the upper section of the threaded blind holes 223*a* and 223*c*.

Figure 4C:
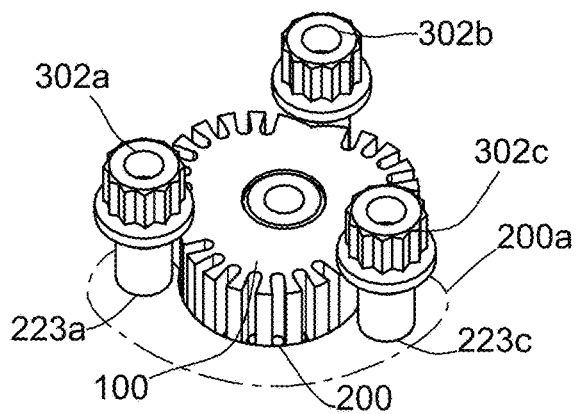
FIG. 4C shows a perspective view of the three bolts of the first type of tensioner unit of FIG. 2A, but without an inner bracket tensioner of the first type of tensioner unit of FIG. 2A, wherein the three bolts have been inserted into the three openings of the first structure, and with the compression module shown inserted into a stepped integration structure opening.

FIG. 4C shows a perspective view of the compression module 100 installed on the partly shown surface 200*a*. FIG. 4C also shows part of three bolts 302*a*, 302*b*, and 302*c* with the upper section of the threaded counter blind holes 223*a*, 223*b*, and 223*c*.

Figure 4D:
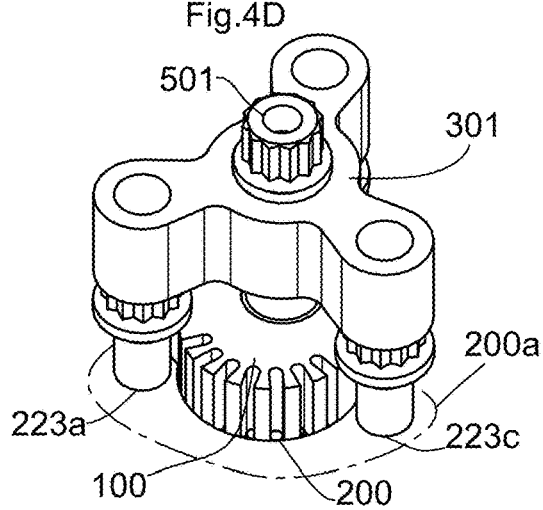
FIG. 4D shows a perspective view of the three bolts of the first type of tensioner unit of FIG. 2A, with the inner bracket tensioner of the first type of tensioner unit of FIG. 2A, placed over the three bolts, wherein the three bolts have been inserted into the three openings of the first structure, and with the compression module shown inserted into a stepped integration structure opening.

FIG. 4D shows the first type of tensioner unit 100 of FIG. 2A, with the inner bracket tensioner 301 placed over the three bolts 302*a*, 302*b*, and 302*c*, wherein the three bolts 302*a*, 302*b*, and 302*c* have been inserted into the three threaded blind holes 223*a*, 223*b*, and 223*c*. In FIG. 4D, the threaded blind holes 223*a*, 223*b* and the stepped integration structure opening 200 are installed in the partly shown upper surface of the adapter module 400, as shown by component 200*a* in FIG. 3A. In FIG. 4D, the compression module 100 is partly shown connected with an extraction bolt 501.

Figure 4E:
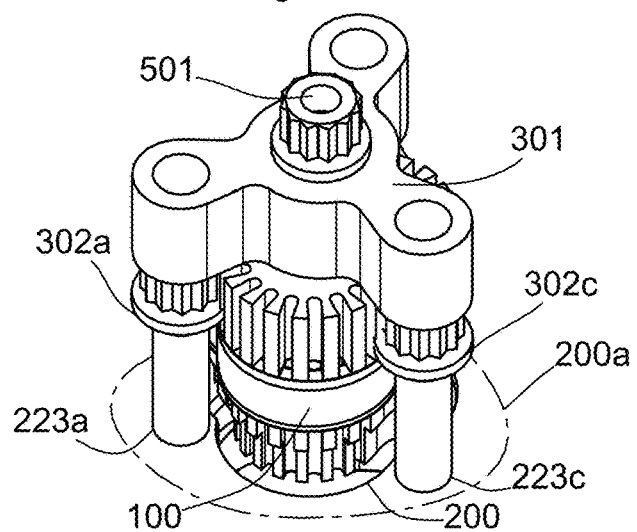
FIG. 4E shows a perspective view of the three bolts of the first type of tensioner unit of FIG. 2A, with the inner bracket tensioner of the first type of tensioner unit of FIG. 2A, placed over the three bolts, wherein the three bolts have been, at least partially pulled out of the three respective openings of the first structure, and with the compression module at least partially pulled out a stepped integration structure opening.

FIG. 4E shows the first type of tensioner unit 300 of FIG. 2A, with the inner bracket tensioner 301 placed over the three bolts 302*a*, 302*b* and 302*c*, wherein the three bolts 302*a*, 302*b*, and 302*c* have been inserted into the three threaded blind holes 223*a*, 223*b*, and 223*c*. In FIG. 4E, the three bolts 302*a*, 302*b* and 302*c* are at least partially pulled out of the threaded blind holes 223*a*, 223*b*, and 223*c*, respectively.

As shown by FIGS. 3A-3E, the stepped integration structure opening 200 shown in FIG. 4E, is located and/or installed in the partly shown upper surface of the adapter modules 400, 420, 440, 460, or 480, respectively, as shown by the location of the structure 200*a* on the surface of adapter modules 400, 420, 440, 460, or 480.

In FIG. 4E, the compression module 100 is partly shown but has been extracted position by the extraction bolt 501.

FIG. 5A, FIG. 5C-E show different views of the apparatus in assembled conditions on central partial section of one of the adapter modules 400 of FIG. 3A, 420 of FIG. 3B 440 of FIG. 3C, 460 of FIG. 3D and 480 of FIG. 3E. The compression module 100 of FIG. 2A with its stepped integration structure opening 200 of FIG. 2A is tensioned with the first type of tensioner unit 300 of FIG. 2A.

FIG. 5A shows a cross section view on plane AA of FIG. 5C. FIG. 5A shows least part of bolt 302*b*, and bolt 302*c* with its counter threaded blind hole 223*c*, inner bracket tensioner 301 with centering chamfer 304, cover 102, inner sealing pillow 103, threaded hole 117 of carrier 101, cavity of cover 127, inner sealing support edge 133, outer sealing pillow 104, sealing support surface 119, outer sealing support edge 134, carrier 101, inner sealing edge 131, inner sealing surface 118, outer sealing chamfer 132, support shoulder 116 of the compression module 100 of FIG. 2A, and the stepped integration structure opening 200 having guiding chamfer 204 sealing support shoulder 205 and carrier support shoulder 206. A portion of the wire bundle 602 is shown. One single wire 601 is at in cross section on the left. FIG. 5A also shows dashed lines identified as B-B and C-C representing cross-section planes.

FIG. 5B shows a front view of the apparatus in assembled conditions without the section of the adapter module 400 of FIG. 3A. The compression module 100 of FIG. 2A with the outer sealing pillow 104b and 104c with its outer sealing chamfer 132 and the carrier 102 with its support shoulder 116. The first type of tensioner unit 300 of FIG. 2A having am inner bracket 301 with at least partial shown bolts 302a-c.

FIG. 5C shows a top view of the apparatus. FIG. 5C shows tops of bolts 302a-c, and top of inner bracket tensioner 301. And top of cover 102 with outer groove (trench, slot) 120 and outer cover contour 125

A dashed line identified as A-A is also shown in FIG. 5C. representing the cross-section plane.

FIG. 5D shows a cross-section B-B top view of the apparatus at height of the sealing plane FIG. 5D shows carrier 101 with the inner sealing pillows 103a-c, outer sealing pillows 104a-c, inner sealing contour 111, outer sealing contour 112 connected to the surface 201 of the stepped integration structure opening 200 of FIG. 2A, wire sealing contour 113, circumferential split contour 114, and sectorial split contour 115. A plurality of wire 601 is shown.

FIG. 5E shows a cross-section C-C top view of the apparatus at the height of the lower end of a carrier 101 of the compression module 100. FIG. 2A with positioning contour 126 and inner groove (trench, slot) 113. A plurality of wire 601 is shown.

FIG. 6 shows an exploded view of the compression module 100, stepped integration structure opening 200, and first type of tensioner unit 300, along with a plurality of wires 602 including wire 601, and a portion of the central surface of one of the adapter modules 400 of FIG. 3A, 420 of FIG. 3B 440 of FIG. 3C, 460 of FIG. 3D and 480 of FIG. 3E. The compression module 100 of FIG. 2A with its stepped integration structure opening 200 of FIG. 2A is tensioned with the first type of tensioner unit 300 of FIG. 2A.

FIG. 6 shows the first type of tensioner unit 300 including bolts 302a-c with its partially shown counter threaded blind holes 223a-c, and inner bracket tensioner 301.

FIG. 6 further shows the stepped integration structure opening 200 having a sealing surface 201 a positioning surface 202 for the compression module 100 a positioning surface 203 for the wire 601 (shown in FIG. 5E) a guiding chamfer 204, a sealing support shoulder 205 and a support shoulder 206 for the carrier 101.

FIG. 6 further shows the compression module 100. on the main part of the carrier 101. The inner sealing pillows 103a-c having an inner sealing edge 131 and an inner sealing support edge 133 and the outer sealing pillows 104a having an outer sealing chamfer 132 and an outer sealing support edge 134. The shown outer reinforcement ring 105 with its slot 198 and inner reinforcement ring 106 does not necessarily have to be applied.

Figure 7:
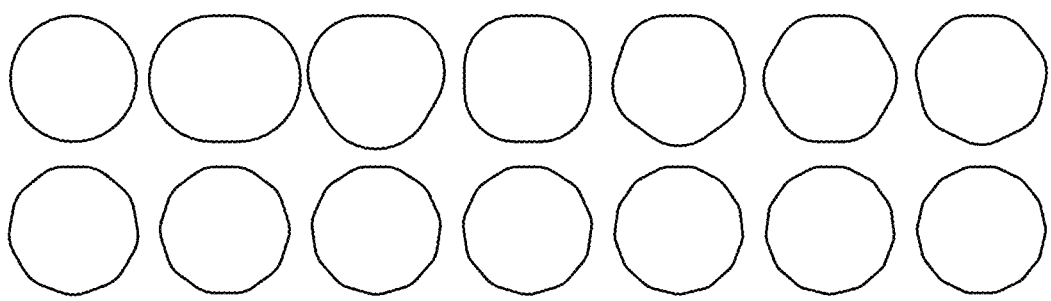
FIG. 7 shows a plurality of possible shapes of the outer sealing contour of FIG. 5D, wherein the shown shapes have a rotational locking function, and are especially used for the tensioner type units of FIGS. 2C and 2D.

FIG. 7 shows a plurality of shapes of possible sealing contours of the outer sealing contour 112 of FIG. 5D, wherein, the shown shapes have a rotational locking effect, typically only used for the tensioner type units of FIGS. 2C and 2D.

Figure 8:
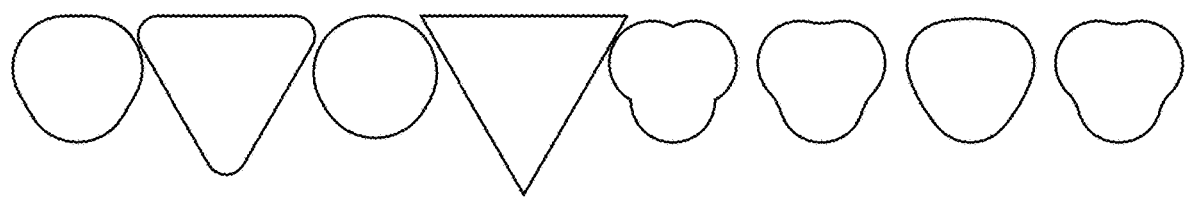
FIG. 8 shows a plurality of shape variation of the base shape of the triangle polygon (FIG. 7 third shape)

FIG. 8 shows a plurality of shape-variations on the base shape of the triangle polygon shape shown in third column of FIG. 7

Figure 9:
FIG. 9 shows a plurality of shapes of the inner sealing contour of FIG. 5D in addition of having a rotational locking function the shape having an undercut enables easier installation of the segmented sealing pillows because it is geometrically held.

FIG. 9 shows a plurality of shapes of possible sealing contours of the inner sealing contours 111 of FIG. 5D in addition to having a rotational locking effect shape having an undercut enables easier installation of the segmented inner/outer sealing 103a-c, 104a-c because it is geometrically held.

Figure 10:
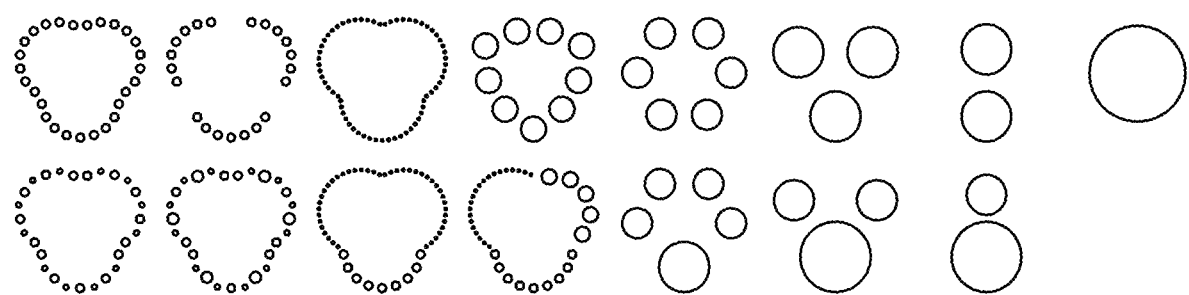
FIG. 10 shows a plurality of wire arrangements configurations with a variation in size, location and quantity and its combinations for installation arrangements on the compression module.

FIG. 10 shows a plurality of configurations of wire arrangements with a variation in size, location and quantity and its combinations for the wire sealing contour 113 on plurality of wire of FIG. of FIG. 5D.

The wire bundle 602, shown in exploded view of FIG. 6, with its single wire 601, is configured to be passed through a separation zone (wall) 606 of the containment 605, shown in FIG. 1, by using the multiple instrumentation gland or apparatus 1 shown in FIG. 1.

The wires of the wire bundle 602 are typically permanently installed on the inner object 604 as shown in FIG. 1. The wires of the wire bundle 602, including single wire 601, have typically an expansion due to the connector 603 and therefore cannot easily be sealed on the smaller diameter of the wire 601 identified as D1 in FIG. 5A where they penetrate the separation zone 606 in FIG. 1. In at least one embodiment, wire bundle 602 includes a plurality of wires, with each of the plurality of wires similar to or identical to the single wire 601.

The universal multiple instrumentation gland or apparatus 1 show in FIG. 1, in at least one embodiment, is comprised of the compression module 100, shown in disassembled state in FIG. 6, and the gland or apparatus 1 is typically installed on the stepped integration structure opening 200. The stepped integration structure opening 200 is implemented in one of the adaptor modules 400, 420, 440, 460, or 480. The compression module 100 gets installed in this stepped integration structure opening 200 by one of the tensioning units 300, 320, 340, or 360, shown in FIGS. 2A-D, respectively. A particular combination of one of the tensioning units of tensioning units 300, 320, 340, or 360 and of one of the adaptor modules of the adaptor modules 400, 420, 440, 460, or 480 is independently chosen according to the specific integration demand for the specific desired application. A version of the universal multiple instrumentation gland or apparatus 1 is shown, at in part, by FIGS. 1 and 6 with tensioner unit 300 and adaptor module 400. For reasons of clarity of description, only part of the apparatus 1 may be shown in FIGS. 1 and/or 6.

On the compression module 100 the wires of wire bundle 602 are located in their position by an inner groove (trench, slot) 113, of a carrier 101, shown in FIG. 5D, and a positioning surface 203, shown in FIG. 6, of the stepped integration structure opening 200. On the sealing plan B-B, shown in FIG. 5D, in accordance with FIG. 5A, the wires of wire bundle 602, get surrounded by inner sealing pillows 103a, 103b, and 103c, and outer sealing pillows 104a, 104b, and 104c. A circumferential split contour 114, shown in FIG. 5D, splits a seal along an arrangement contour which has the identical shape, in at least one embodiment, as the previously mentioned circumferential split contour 114, and which connects to the wire sealing contour 113 in FIG. 5D.

In FIG. 5D, the inner sealing pillows 103a-c and the outer sealing pillows 104a-c are split on the sectorial split contour 115, and this enables installation and deinstallation of the compression module 100 when the wire bundle 602 is still present in the stepped integration structure opening 200. The sectorial split contour 115 is not mandatory; and the sectorial splitting can be chosen according to the demand of the desired application. The split can vary from none to a plurality.

The material for the sealings 103a-c and 104a-c of FIG. 6, in at least one embodiment, is preferred to be, and may need to be squeezable and/or elastic, and may be graphite, rubber, compressible silicates, lava, soapstone or any other squeezable and/or elastic material. For the other components of the apparatus 1, such as the adaptor module 400, carrier 101, and cover 102 of FIG. 6, the material can be metallic, plastic, or ceramic or any other stiffer material than the material for the sealings 103a-c and 104a-c of FIG. 6. If the material for the adaptor module 400, the carrier 101, and the cover 102 of FIG. 6 and the material for the sealings 103a-c and 104a-c of FIG. 6 are chosen as electrically insulated, current-carrying wires of the wire bundle 602 could also be installed in the compression module 100.

The compression module 100 with its components and contours identified with numerical designations in the 100s is shown in following shape mode.

Starting from the left in FIG. 8, the shape shown in the sixth column is used, in at least one embodiment as in FIG. 2A, for example, as a contour for the stepped integration structure opening 200. However, the shape of the opening 200 may be any of the other shapes shown in FIG. 8 or any other imaginable closed contour.

Having a rotational look shape introduced is beneficial for certain tensioner units 440 and 460.

Starting from the left in FIG. 9, the shape shown in the first column is used, in at least one embodiments, as in FIG. 5D for the inner sealing contour 111. However, the shape for the inner sealing contour may be any of the other shapes shown in FIG. 9 or any other imaginable closed contour.

Having a rotational look shape introduced is beneficial for certain tensioner types 440 and 460 and having additionally a shape with undercut for the inner sealing pillows 103a-c is beneficial, in at least one embodiment, when the inner sealing pillows 103a-c are equipped with sectorial split contours 115 for installation. The inner sealing contour 111 can be omitted if no disassembling of the compression module 100 from the outside is needed. With that, the inner sealings 103a-c would be implemented as complete core.

Having the sealings 103a-c, 104a-c split in a sectorial direction enables independent configurations of various wire sizes. FIG. 10 shows an extract of possible wire array configurations for the wire bundle 602 or as alternatives to the wire bundle 602. However, the configurations shown in FIG. 10 are not exclusive and other configurations are possible. The wire sealing contour 113 is typically split and connected to the circumferential split contour 114 to the sealings 103a-c, 104a-c. The wires can be arranged in any imaginable array of sizes and locations.

The support surface 116, shown in FIG. 5A, on the stepped integration structure opening 200 is used for positioning the compression Module 100 onto the particular adaptor module of 400, 420, 440, 460, or 480.

The integrated sealing support shoulder 205, and a support shoulder 206 shown in FIG. 5A, on the stepped integration structure opening 200 acts as counter surface for the carrier 101.

The surface support shoulder 116 and outer sealing chamfer 132 of the counter surface of outer sealing pillow 104a shown in FIG. 5A, and the previously mentioned sealing chamfer 132 can also be implemented as flat surface, according to the demand of the application. The sealing pillows 103a-c and 104a-c, show in FIG. 5D typically get covered by the cover 102 shown in FIG. 5C. The cover 102 has the same outer contour 120, shown in FIG. 5C, as the sealing surface 201, shown in FIG. 2D of the stepped integration structure opening 200.

The cover 102, shown in FIG. 5C, has outer grooves (trench, slot) 120 to enable installation of the wires of the wire bundle 602. The cover 102, has on the inside a cavity 127 shown in FIG. 5A. The cavity 127 has also the contour of the inner sealing contour 111 shown in FIG. 5D.

The sealing pillows 103a-c and 104a-c get squeezed in between the carrier 101 and the cover 102. The cover 102 gets tensioned by one of the tensioner units 300, 320, 340, or 360. The force for the compression of the sealing is introduced by the particular tensioner unit of 300, 320, 340, or 360.

The thread hole 117, shown in FIG. 5A, is used to pull for disassembling the compression module 100, the particular tensioner unit of 300, 320, 340, or 260 and the particular adaptor unit of 400, 420, 440, 460, or 480. The thread hole 117 is bored into the carrier 101 as shown in FIG. 5A.

The outer cover contour 125 shown in FIG. 5C of the cover 102 has typically the same shape as the outer sealing contour 202 shown in FIG. 6. If either tensioner unit 340 or 360 is used, in at least one embodiment, it is beneficial to have outer cover contour 125 of FIG. 5C shaped round on the upper end of the cover 102.

The free opening of the stepped integration structure opening 200, shown in FIG. 6, is typically larger than the restriction due to an installed connector 603 of FIG. 1 on the wires of the wire bundle 602. In at least one embodiment, the enables fully equipped wire installation for the wires of wire bundle 602.

The sectorial split contours 115a, 115b, 115c, shown in FIG. 5D, are not mandatory but for many applications it may be beneficial to have the contours 115a-c.

The outer sealing pillows 104a-c, need at least one sectorial split contour 115a-c, respectively, to be able to exchange the sealing pillows 104-c, without decoupling the connectors 603 of FIG. 1.

In at least one embodiment, if no sectorial split contour 115a-c is present the sealing pillows 104a-c will be merged into one single piece sealing ring pillow (merged 104a-c) which will have the same appearance as the sealing ring pillows 104a-c but without the sectorial split contour 115a-c integrated. With this single piece sealing ring pillow (merged 104a-c) the compression module 100 still works but to exchange the single piece sealing ring pillow (merged 104a-c), the connectors 603 of FIG. 1 need to be decoupled and the single piece sealing ring pillow (merged 104a-c) needs to be reeled in. Having slots 198 and 199, shown in FIG. 6 on the outer ring 105 and the inner ring 106 present also enables installation of the wire bundle 602 of FIG. 1 with connector 603 of FIG. 1 to be used for coupling. The connector 603 may be coupled to any higher-level application, which may be anything which is not directly related to the gland 1, such as a sensor transmitter, a data acquisition unit, a control unit, a transmitter, a higher-level system, etc.

The pocket 127, shown in FIG. 5A, is configured to be extended over the entire height of the cover 102.

If the cover 102 has a non rounded shape, a polygonal rotational locking shape should be used for the slider ring 342, shown in FIG. 2C, or the extension ring 362, shown in FIG. 2D, and accordingly an additional mutual counter shape on the upper end of the sealing surface 201, shown in FIG. 6, should be introduced on the stepped integration structure opening 200.

If the circumferential split contour 114 and the inner sealing contour 111 shown in FIG. 5D is replaced by a shape which has an undercut, this enables easier installation of the sealing pillows 103a-c, 104a-c because they are geometrically held on the inner sealing contour 111. The same effect is possible for the outer sealing pillows 104a-c if the circumferential split contour 114 and the wire sealing contour 113 shown in FIG. 5D, are shaped and arranged in such a way that when the wires of wire bundle 602 are present the outer sealing pillows 104a-c gets geometrically held. This arrangement is mainly beneficial when several sectorial split contours 115a, 115b, 115c are present.

For the inner bracket tensioner 301 and outer bracket tensioner 321 of respectively tensioner units 300 and 320, with tensioner bolts 302a-c, or 322a-c and threaded holes 223a-c as shown in FIGS. 2A-B, respectively, the number of bolts used for bolts 302a-c or 322a-c can be varied with the corresponding adapter bores of bores 223a-c. For example, the inner bracket tensioner 301 may have two, four, five, or six more levers/ribs with its bores and bolts or the inner bracket tensioner 321 may have two, four, five or six more bores and corresponding bolts.

Outer ring 105 and inner ring 106 enable higher sealing performance. However, aperture identified as compression module 100 in FIG. 6 can also function without rings 105 and 106 in some desired uses.

The inner core chamfer 131, inner ring chamfer 132, outer core edge 133 and outer ring edge 134, shown in FIG. 5A, present in the compression module 100 in FIG. 6 are beneficial for specific tight applications and enhance leak performance. The chamfers 131 and 132 may, in at least one embodiment, be flat surfaces.

The guiding chamfer 204, shown in FIG. 5A, helps for easier installation of the compression module 100 into the stepped integration structure opening 200.

The above described undercut of the circumferential split contour 114 and the arrangement of the wire sealing contour 113 to the circumferential split contour 114, shown in FIG. 5D, in such way that the outer sealing pillows 104a-c are geometrically held enables easy installation of the wire bundle 602.

By introducing the circumferential split contour 114 and a sectorial split contour 115a-c on the inner and outer sealing pillow 103a-c and 104a-c, as shown in FIG. 5D, this enables easy installation and maintenance. In addition, a high variety of wire arrangement FIG. 10, as shown in FIG. 10, can be implemented.

In at least one embodiment, having trenches outer groove (trench, slot) 120 present on cover 102 and inner groove (trench, slot) 113 on carrier 101 enables on one hand a maximized equipping of wire 601 quantity on a small space and on the other hand an exchangeability of the sealing pillows 103a-c, 104a-c for maintenance purposes on still installed condition of the wire bundle 602.

The rotational locking introduced on the stepped integration structure opening 200 and the inner sealing contour 111 enables the use of tensioner unit 340 or 360 because the introduced tensioning torque will be applied to the rotational locking contours and not to the wire bundle 602.

Using the adaptor module 400 (bulkhead style) enables pre-installation of the instrumentation gland 1 even if the object 604 is not installed in the containment 605.

The extraction bolt 501 and the threaded hole 117 on the carrier 101 enables the maintenance of the instrumentation gland 1 having only access to the separation zone (wall) 606 form the outside.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

I claim:

1. An apparatus comprising:
a sealing gland comprising
a tensioner unit;
a compression module; and
a first structure;
wherein the first structure has a first opening into which the compression module is configured to be inserted;
wherein the first structure has a plurality of further openings into which part of the tensioner unit is configured to be inserted;
wherein the compression module has a first plurality of grooves which surround a first hole;
wherein each of the first plurality of grooves is configured to receive a different wire of a bundle of wires;
wherein the tensioner unit has a plurality of bolts; and
wherein each bolt of the plurality of bolts is configured to be inserted into a corresponding one of the plurality of further openings of the first structure, while each of the other bolts of the plurality of bolts are inserted into a corresponding one of the plurality of further openings of the first structure;
wherein the compression module includes a cover which includes the first plurality of grooves and the first hole;
wherein the compression module includes a carrier which includes a second plurality of grooves and a second hole, wherein the second hole is a threaded hole;
wherein the first hole and the second hole are configured to be aligned when the cover and the carrier are connected;
wherein the first plurality of grooves and the second plurality of grooves are configured to be aligned when the cover and the carrier are connected;
wherein each of the second plurality of grooves is configured to receive a different wire of the bundle of wires;
wherein the compression module includes a plurality of inner sealing pillows;
wherein the compression module includes a plurality of outer sealing pillows;
and wherein the bundle of wires are configured to be surrounded by a combination of the inner sealing pillows and the outer sealing pillows, when the cover and the carrier are connected so that the inner sealing pillows and the outer sealing pillows are between the cover and the carrier.

2. The apparatus of claim 1
further comprising an extraction bolt configured to be inserted into the first hole in order to extract the compression module at least partly from the first structure.

3. An apparatus comprising:
a sealing gland comprising:
a tensioner unit;
a compression module; and
a first structure;
wherein the first structure has a first opening into which the compression module is configured to be inserted;
wherein the first structure has a plurality of further openings into which part of the tensioner unit is configured to be inserted;

wherein the first opening of the first structure is surrounded by a peripheral wall;
wherein the peripheral wall includes a plurality of steps; and
wherein the plurality of steps includes a guiding chamfer, followed by a sealing surface, followed by a first support shoulder, followed by a first positioning surface, followed by a second support shoulder, and followed by a second positioning surface.

4. The apparatus of claim 3 wherein
the first positioning surface is configured to support the compression module when it is inserted into the first opening.

5. The apparatus of claim 4 wherein
the second positioning surface is configured to support a plurality of wires.

6. The apparatus of claim 5 wherein
the second support shoulder is configured to support a carrier of the compression module.

7. The apparatus of claim 1 wherein
the first structure is part of an adaptor module.

8. A method comprising:
using a sealing gland to prevent leakage of fluid past a joint in machinery;
wherein the sealing gland is comprised of:
  a tensioner unit;
  a compression module; and
  a first structure;
wherein the first structure has a first opening into which the compression module is configured to be inserted;
wherein the first structure has a plurality of further openings into which part of the tensioner unit is configured to be inserted;
wherein the compression module has a first plurality of grooves which surround a first hole;
wherein each of the first plurality of grooves is configured to receive a different wire of a bundle of wires;
wherein the tensioner unit has a plurality of bolts;
wherein each bolt of the plurality of bolts is configured to be inserted into a corresponding one of the plurality of further openings of the first structure, while each of the other bolts of the plurality of bolts are inserted into a corresponding one of the plurality of further openings of the first structure;
wherein the compression module includes a cover which includes the first plurality of grooves and the first hole;
wherein the compression module includes a carrier which includes a second plurality of grooves and a second hole, wherein the second hole is a threaded hole;
wherein the first hole and the second hole are configured to be aligned when the cover and the carrier are connected;
wherein the first plurality of grooves and the second plurality of grooves are configured to be aligned when the cover and the carrier are connected;
wherein each of the second plurality of grooves is configured to receive a different wire of the bundle of wires;
wherein the compression module includes a plurality of inner sealing pillows;
wherein the compression module includes a plurality of outer sealing pillows;
and wherein the bundle of wires are configured to be surrounded by a combination of the inner sealing pillows and the outer sealing pillows, when the cover and the carrier are connected so that the inner sealing pillows and the outer sealing pillows are between the cover and the carrier.

9. The method of claim 8
further comprising inserting an extraction bolt into the first hole, in order to extract the compression module at least partly from the first structure.

10. A method comprising:
using a sealing gland to prevent leakage of fluid past a joint in machinery;
wherein the sealing gland is comprised of:
  a tensioner unit;
  a compression module; and
  a first structure;
wherein the first structure has a first opening into which the compression module is configured to be inserted;
wherein the first structure has a plurality of further openings into which part of the tensioner unit is configured to be inserted;
wherein the first opening of the first structure is surrounded by a peripheral wall;
wherein the peripheral wall includes a plurality of steps; and
wherein the plurality of steps includes a guiding chamfer, followed by a sealing surface, followed by a first support shoulder, followed by a first positioning surface, followed by a second support shoulder, and followed by a second positioning surface.

11. The method of claim 10 wherein
the first positioning surface is configured to support the compression module when it is inserted into the first opening.

12. The method of claim 11 wherein
the second positioning surface is configured to support a plurality of wires.

13. The method of claim 12 wherein
the second support shoulder is configured to support a carrier of the compression module.

14. The method of claim 8 wherein
the first structure is part of an adaptor module.

* * * * *